July 17, 1962  H. W. TREVASKIS  3,044,494
LEVELLING VALVE MECHANISMS
Filed Feb. 2, 1960  2 Sheets-Sheet 1

Inventor
Henry William Trevaskis
by Benj. T. Rauber
his attorney

July 17, 1962 H. W. TREVASKIS 3,044,494
LEVELLING VALVE MECHANISMS
Filed Feb. 2, 1960 2 Sheets-Sheet 2

Inventor
Henry William Trevaskis
by Benj. T. Rauber
his attorney

United States Patent Office 3,044,494
Patented July 17, 1962

3,044,494
LEVELLING VALVE MECHANISMS
Henry William Trevaskis, Point Pleasant, Blackdown near Leamington Spa, England, assignor to Dunlop Rubber Company Limited, London County, England, a company of Great Britain
Filed Feb. 2, 1960, Ser. No. 6,132
Claims priority, application Great Britain Feb. 7, 1959
10 Claims. (Cl. 137—627.5)

This invention relates to levelling valve mechanisms of the kind used in vehicle suspension systems comprising one or more fluid springs, and which are adapted, when actuated, to permit flow of fluid into or from the spring or springs, according to the direction of movement of an actuating member responsive to changes in level of the sprung portion of the vehicle.

The principal object of the present invention is to provide an improved levelling valve mechanism which is sensitive in operation.

The invention provides a levelling valve mechanism of the above kind comprising a casing having an outlet port for communication with the fluid spring or springs, an outlet port for connection to a source of fluid pressure and an outlet port, inlet and exhaust valves in the casing which are respectively operable to connect the outlet port to the inlet port and to the exhaust valve, a pair of pressure-responsive devices in the casing each associated with one of the valves and means controlled by the actuating member, according to its direction of movement, for adjusting the pressure acting on one or other of the responsive devices and thereby causing said device to actuate its respective valve.

Figure 2:
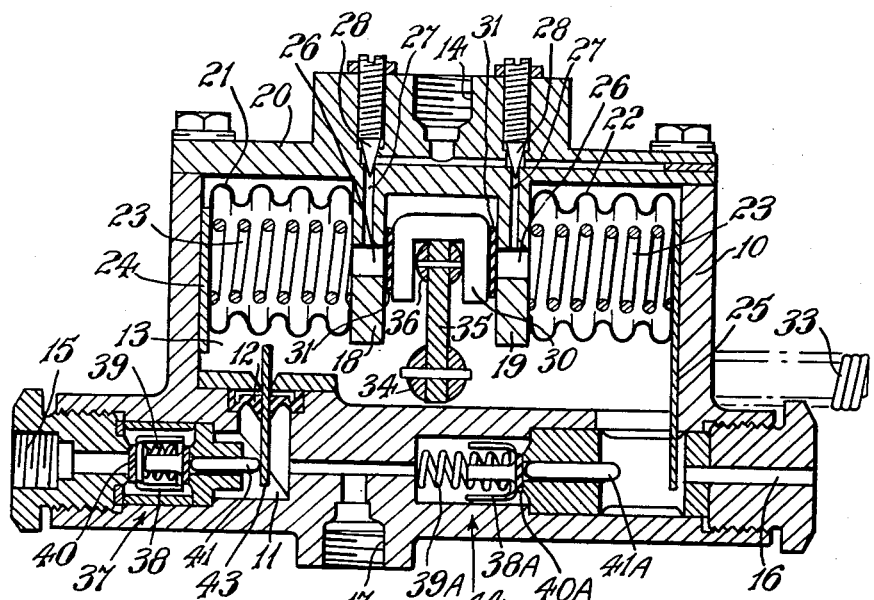
Figure 1:
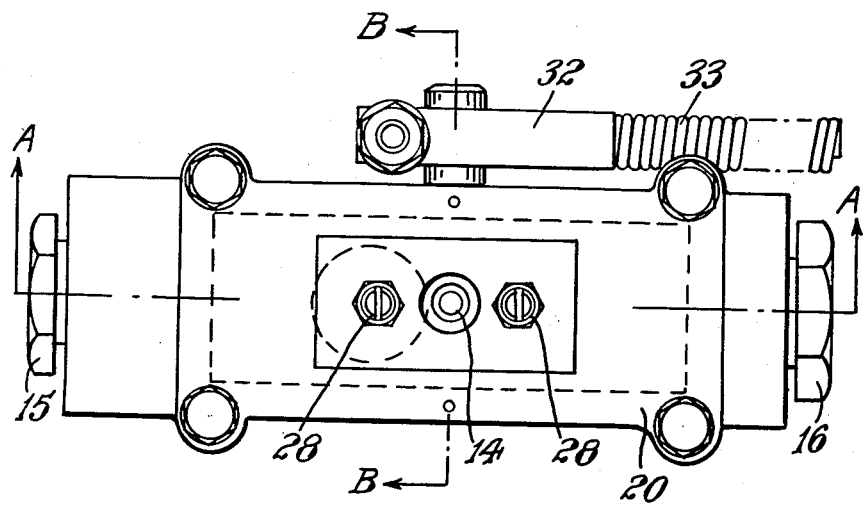
Figure 3:
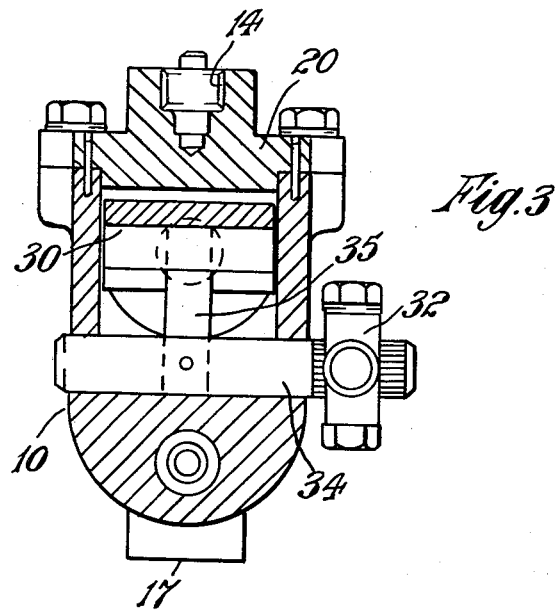
Figures 4, 5:
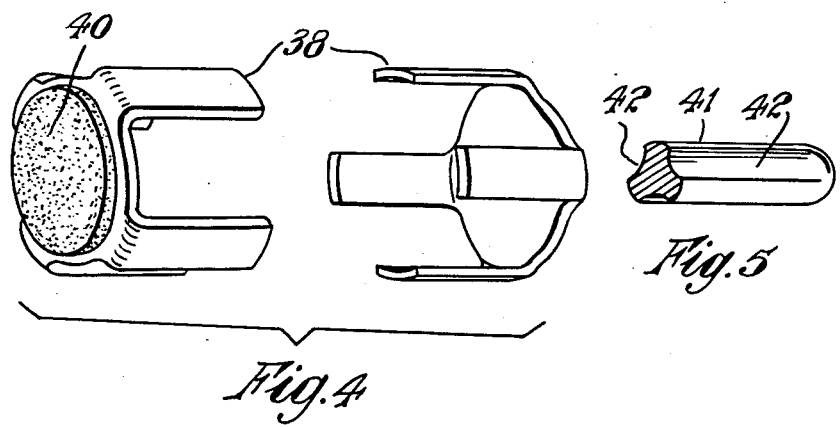

One embodiment of levelling valve mechanism according to the invention will now be described in more detail, by way of example, with reference to the accompanying drawings, in which:

FIGURE 1 is a plan view of the valve mechanism,
FIGURES 2 and 3 are respectively sections on the lines A—A and B—B in FIGURE 1, and
FIGURES 4 and 5 are respectively detail perspective views of the valve cups and the tappet associated with the inlet and exhaust valves.

The levelling valve mechanism illustrated comprises a casing 10 formed with a valve chamber 11 isolated by a seal 12 from a chamber 13 which is open to ambient pressure through exhaust port 16. A tapped bore 14 in the cover 20 of the valve casing is connected, when the valve is installed, to a source of sub-atmospheric pressure. The valve chamber 11 has an inlet 15 for connection to a source of fluid pressure, an exhaust outlet 16 and an outlet 17 for connection to an associated fluid spring.

Partitions 18, 19 extend downwardly into the chamber 13 from the cover 20. Axially aligned bellows 21, 22 are provided in the chamber 13, the inner ends of the bellows being respectively secured in a fluid-tight manner to the partitions 18, 19. A spring 23 is provided in each bellows and mounted in compression between the associated partition and the outer end of the bellows.

The bellows 21, 22 carry at their outer end operating arms 24, 25 which are normally held by the springs 23 in contact with the walls of the casing as shown in FIGURE 2. The springs may be weak as there is little resistance to their expansion when the pressures inside and outside the bellows are equalized.

Each partition is formed with a port 26, the two ports 26 being axially aligned one with the other and with the bellows, and opening to the interiors of the respective bellows.

Ducts 27 in the cover connect the ports 26 with the inlet 14 and needle valves 28 in the ducts enable flow of fluid through the ducts 27 and associated ports 26 to be independently adjusted.

In the space between the partitions is disposed a U-shaped yoke 30 which carries on the outer faces of its limbs a pair of closure pads 31 of rubber or like resilient material. The overall dimension of the yoke 30 and closure pads 31 is less than the distance between the partitions so that the yoke 30 may assume any of three positions, namely the neutral position shown in FIGURE 2 in which it is spaced from both partitions or either of two operative positions in which one or other of the closure pads 31 abuts one or other of the partitions and closes one or other of the ports 26.

In use of the levelling valve mechanism, the casing 10 is mounted on the sprung part of a vehicle and an actuating lever 32 is connected by a spring 33 to a member fixed to the unsprung part of the vehicle. The lever 32 is fixed to a shaft 34, carrying an arm 35 having at its upper end a ball fitting 36 engaging between the limbs of the yoke 30.

The valve chamber contains an inlet valve 37 constituted by a pair of cups 38, of the configuration shown most clearly in FIGURE 4, which are urged apart by a spring 39. The cups 38 carry on their outer faces rubber closure pads 40 which are normally held by the spring 39 in the sealing position shown in FIGURE 2. A tappet 41, formed with longitudinal grooves 42 (FIGURE 5) is disposed between the right hand cup 38 and a lever 43 which extends downwardly through the seal 12. When the lever 43 is rocked clockwise, as later described, the tappet is moved to the left, displacing the right hand cup 38 to the left. The left hand cup 38 is then moved to the right by the fluid pressure prevailing at the inlet 15, so opening the inlet valve and allowing fluid to flow through the inlet valve 37 and the groove 42 in the tappet 41 to the outlet 17.

The valve chamber also contains an exhaust valve 44 of similar construction to the inlet valve, except that it includes a single cup 38A only carrying a rubber closure pad 40A and associated with a grooved tappet 41A identical with the tappet 41. When the tappet 41A is moved to the left, the exhaust valve is opened against the action of its spring 39A, allowing fluid to flow from the fluid spring through the outlet 17 and the grooves in the tappet 41A to the exhaust outlet 16.

In operation, the yoke 30 remains in the neutral position shown in FIGURE 2 when the vehicle load is constant and the vehicle is at rest, so that the subatmospheric pressure communicated through the ducts 27 to the ports 26 and the bellows 21 does not deform the bellows because they are open to atmosphere through the uncovered ports 26.

If the load on the chassis is decreased the natural tendency is for the fluid spring to expand allowing the chassis and axle to separate from one another. When such movement takes place, the arm 35 is rocked clockwise by the lever 32, thereby causing the right hand closure pad 31 on the yoke 30 to mask the port 26 communicating with the bellows 22. As the result, the bellows 22 contracts axially because its interior is under sub-atmospheric pressure, whereas its exterior is subjected to atmospheric pressure. The arm 25 is accordingly moved inwardly by the contracting bellows and impacts and moves to the left the tappet 41A of the exhaust valve 44. Hence, the latter opens and allows fluid to flow from the system until the fluid spring returns to its original position, the return movement being transmitted through the linkage 32, 34, 35 and causing the yoke 30 to uncover the port 26. When this occurs, the spring 23 expands the bellows 23 again thereby moving the arm 25 away from the tappet 41A and allowing the spring 39A to close the exhaust valve 44 and prevent further loss of fluid from the system.

If the load on the chassis is increased, the linkage 32, 34, 35 is moved in the opposite direction and the port 26 of the other bellows 21 is closed by the yoke 30. The resulting contraction of the bellows 21 causes the arm 24 to impact the lever 43 and rock it clockwise, with the result that it moves the tappet 41 to the left to open the inlet valve 37. Fluid then flows into the suspension system to restore the fluid spring to the position it occupied prior to the increase in load. When the spring has been so restored, the linkage 32, 34, 35 is returned to its original position, the port 26 is uncovered, and the bellows 21 expands again to release the lever 43 and allow the spring 39 to close the inlet valve 37 and so prevent further flow of fluid into the system.

Having now described my invention, what I claim is:

1. A levelling valve mechanism for pneumatic springs comprising a casing having an outlet port for communication with a fluid spring, an inlet port for connection to a source of fluid pressure and an exhaust port, inlet and exhaust valves in the casing spring pressed to closed position and operable to connect the outlet port to the inlet port and to the exhaust port respectively, a pair of enclosures in said casing each having a valve actuating element movable to open one of said valves, one side of each element being exposed to atmospheric pressure, each said enclosure having a passage for the unobstructed entrance of air under atmospheric pressure, an actuating member movable from a mid position alternatively to close each of said passages, said casing having a restricted duct from each enclosure to a source of subatmospheric pressure to reduce the pressure below atmospheric pressure upon closure of said passage, each said valve actuating element being positioned to open said inlet valve and said exhaust valve upon movement to a distance from inactive position.

2. A valve mechanism according to claim 1, wherein the enclosures and valve actuating elements are bellows mounted in a chamber in the casing open to atmosphere, each of the bellows having a passage normally open to the chamber, and wherein said ducts enter said passages and a member coupled to the actuating member and movable thereby from a neutral position to close one or other of said passages, according to the direction of movement of the actuating member, and thereby to disconnect the interior of the associated bellows from the casing while leaving it subject to subatmospheric pressure.

3. A valve mechanism according to claim 2, in which each bellows carries at the end remote from its passage an arm arranged to actuate the associated valve on contraction of the bellows as the result of closure of its ports.

4. A valve mechanism according to claim 3, wherein the bellows are axially aligned with their passages facing one another and the passage closing member is a yoke mounted between the facing ends of the bellows.

5. A valve mechanism according to claim 2 in which each bellows has an internal return spring.

6. A valve mechanism according to claim 3, in which the outlet and exhaust valves have associated grooved tappets, each of which is arranged to be actuated by the arm on its respective bellows to open its valve, the grooves in the tappets permitting of flow of fluid between the outlet and inlet and exhaust ports respectively.

7. The levelling valve mechanism of claim 1 in which said inlet valve comprises a valve chamber in said casing having an entrance from said inlet port and an outlet to said outlet port, said entrance and outlet each having a valve seat in said chamber, a valve element in said chamber seating on said entrance valve seat, a valve element seating on said outlet valve seat and a spring between said elements biasing them to their respective closed positions.

8. The levelling valve mechanism of claim 7 having an actuating rod extending through said outlet and engaging said valve element seating on said outlet valve seat and a lever engaging said rod and engaged by said valve actuating member.

9. The levelling valve mechanism of claim 7 in which said actuating member comprises a yoke having on the outer faces of its limbs a closure pad to seat against the passages to said enclosure and a pivoted rock arm engaging said yoke to move it alternatively to one of said passages.

10. The levelling valve mechanism of claim 7 having means to control the restriction in each of said ducts.

References Cited in the file of this patent
UNITED STATES PATENTS
2,913,004    Norton _____ Nov. 17, 1959